US012039320B2

(12) United States Patent
Jeong et al.

(10) Patent No.: US 12,039,320 B2
(45) Date of Patent: Jul. 16, 2024

(54) APPARATUS FOR VEHICLE OVER-THE-AIR UPDATING, AND METHOD THEREOF (71) Applicants: Hyundai Motor Company, Seoul (KR); Kia Corporation, Seoul (KR)

(72) Inventors: Hyeok Sang Jeong, Gyeonggi-do (KR); Myeong Gyu Jeong, Seoul (KR); Jin Ah Kim, Gyeonggi-do (KR); Yoon Sik Jung, Seoul (KR); Hak Jun Kim, Gyeonggi-do (KR); Dong Youl Lee, Seoul (KR); Young Jee Yang, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 100 days.

(21) Appl. No.: 17/752,392

(22) Filed: May 24, 2022

(65) Prior Publication Data
US 2023/0052414 A1 Feb. 16, 2023

(30) Foreign Application Priority Data

Aug. 13, 2021 (KR) .................. 10-2021-0107195

(51) Int. Cl.
*G06F 8/65* (2018.01)
*B60L 58/12* (2019.01)
*G06F 9/445* (2018.01)
*G06F 8/61* (2018.01)

(52) U.S. Cl.
CPC .............. *G06F 8/65* (2013.01); *B60L 58/12* (2019.02); *G06F 8/61* (2013.01)

(58) Field of Classification Search
CPC ... G06F 8/65; G06F 8/61; G06F 9/445; B60L 58/12
See application file for complete search history.

(56) References Cited

U.S. PATENT DOCUMENTS

| 2017/0300313 | A1* | 10/2017 | Gantt, Jr. ................ H04L 67/12 |
| 2018/0018160 | A1* | 1/2018 | Teraoka .................... G06F 8/65 |
| 2021/0188243 | A1* | 6/2021 | Morii ........................ G06F 8/65 |
| 2021/0389940 | A1* | 12/2021 | Iwata .................... B60L 53/665 |
| 2022/0123570 | A1* | 4/2022 | Fuchs ...................... H02J 9/002 |
| 2022/0144288 | A1* | 5/2022 | Mitsutani ............ B60W 30/182 |
| 2022/0258640 | A1* | 8/2022 | Ando .................... B60L 53/305 |
| 2022/0326934 | A1* | 10/2022 | Goto .................. G06F 11/0796 |

OTHER PUBLICATIONS

Xiaosong Hu et al., Integrated Optimization of Battery Sizing, Charging, and Power Management in Plug-In Hybrid Electric Vehicles, May 2016, [Retrieved on Feb. 6, 2024]. Retrieved from the internet: <URL: https://ieeexplore.ieee.org/stamp/stamp.jsp?tp=&arnumber=7274336> 8 Pages (1036-1043) (Year: 2016).*

* cited by examiner

*Primary Examiner* — Anibal Rivera
(74) *Attorney, Agent, or Firm* — Fox Rothschild LLP (57) ABSTRACT An over-the-air (OTA) update apparatus for a vehicle may include an update management device for generating mode information about an OTA update of the vehicle, an update execution device for performing OTA updates of one or more controllers included in the vehicle based on the generated mode information, and a battery charging control device for controlling charging of a low-voltage battery of the vehicle based on the generated mode information.

18 Claims, 4 Drawing Sheets

APPARATUS FOR VEHICLE OVER-THE-AIR UPDATING, AND METHOD THEREOF

CROSS-REFERENCE TO RELATED APPLICATION

This application claims under 35 U.S.C. § 119(a) the benefit of Korean Patent Application No. 10-2021-0107195, filed in the Korean Intellectual Property Office on Aug. 13, 2021, the entire contents of which are incorporated herein by reference.

BACKGROUND

(a) Technical Field

The present disclosure relates to an over-the-air update apparatus for a vehicle and a method thereof.

(b) Description of the Related Art

In general, an OTA update of a vehicle is performed based on a low-voltage battery included in the vehicle. However, because a state-of-charge (SOC) value of the low-voltage battery has a limit, when the OTA update is performed depending on a low-voltage battery that is not being charged, the OTA update may not be completed and the low-voltage battery may be discharged.

Furthermore, even though the OTA update is performed while the low-voltage battery is charged, when the OTA update is not performed after priorities of OTA updates of one or more controllers included in the vehicle are determined, an efficient OTA update may not be performed.

SUMMARY

An aspect of the present disclosure provides an apparatus that charges a low-voltage battery while performing an over-the-air (OTA) update, and a method thereof.

Furthermore, an aspect of the present disclosure provides an apparatus that determines priorities among OTA updates of vehicle controllers while charging a low-voltage battery and performing an OTA update at the same time, and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an over-the-air (OTA) update apparatus for a vehicle may include an update management device generating mode information about an OTA update of the vehicle, an update execution device performing OTA updates of one or more controllers included in the vehicle based on the generated mode information, and a battery charging control device controlling charging of a low-voltage battery of the vehicle based on the generated mode information.

Furthermore, according to embodiments, the mode information may be generated based on at least one of an SOC value of a high-voltage battery of the vehicle, an SOC value of the low-voltage battery of the vehicle, or a power state of the vehicle.

Moreover, according to embodiments, the update management device may generate first mode information indicating that the OTA update of the vehicle is performed, when the SOC value of the high-voltage battery is greater than or equal to a preset first value, the SOC value of the low-voltage battery is greater than or equal to a preset second value, and the vehicle is powered off.

Also, according to embodiments, the one or more controllers may include a first controller and a second controller. An OTA update of the first controller may be performed based on the low-voltage battery that is not being charged. An OTA update of the second controller may be performed based on the low-voltage battery that is being charged.

Besides, according to embodiments, the update execution device may perform the OTA update of the first controller included in the one or more controllers when the first mode information is generated.

In addition, according to embodiments, the battery charging control device may not charge the low-voltage battery when the first mode information is generated.

Furthermore, according to embodiments, the update management device may generate second mode information indicating that the OTA update of the second controller is performed, when the OTA update of the first controller is completed.

Moreover, according to embodiments, the update execution device performs the OTA update of the second controller included in the one or more controllers when the second mode information is generated.

Also, according to embodiments, the battery charging control device may turn on low-voltage battery charging power used to charge the low-voltage battery and may charge the low-voltage battery when the second mode information is generated. The low-voltage battery charging power may correspond to a part of power of the vehicle.

Besides, according to embodiments, the update management device may generate third mode information indicating that charging of the low-voltage battery is interrupted and the low-voltage battery charging power is turned off, in response to the OTA update of the second controller is completed.

According to an aspect of the present disclosure, an over-the-air (OTA) update method for a vehicle may include generating, by an update management device, mode information about an OTA update of the vehicle; performing, by an update execution device, OTA updates of one or more controllers included in the vehicle based on the generated mode information; and controlling, by a battery charging control device, charging of a low-voltage battery of the vehicle based on the generated mode information.

Furthermore, according to embodiments, the mode information may be generated based on at least one of an SOC value of a high-voltage battery of the vehicle, an SOC value of the low-voltage battery of the vehicle, or a power state of the vehicle.

Moreover, according to embodiments, the generating of the mode information may include generating first mode information indicating that the OTA update of the vehicle is performed, when the SOC value of the high-voltage battery is greater than or equal to a preset first value, the SOC value of the low-voltage battery is greater than or equal to a preset second value, and the vehicle is powered off.

Also, according to embodiments, the one or more controllers may include a first controller and a second controller. An OTA update of the first controller may be performed based on the low-voltage battery that is not being charged. An OTA update of the second controller may be performed based on the low-voltage battery that is being charged.

Besides, according to embodiments, the performing of the OTA updates may include performing the OTA update of the first controller included in the one or more controllers when the first mode information is generated.

In addition, according to embodiments, the controlling of the charging of the low-voltage battery may include not charging the low-voltage battery when the first mode information is generated.

Furthermore, according to embodiments, the generating of the mode information may further include generating second mode information indicating that the OTA update of the second controller is performed, when the OTA update of the first controller is completed.

Moreover, according to embodiments, the performing of the OTA updates may further include performing the OTA update of the second controller included in the one or more controllers when the second mode information is generated.

Also, according to embodiments, the controlling of the charging of the low-voltage battery may include turning on low-voltage battery charging power used to charge the low-voltage battery and charging the low-voltage battery when the second mode information is generated. The low-voltage battery charging power may correspond to a part of power of the vehicle.

Besides, according to embodiments, the generating of the mode information may further include generating third mode information indicating that charging of the low-voltage battery is interrupted and the low-voltage battery charging power is turned off, in response to the OTA update of the second controller is completed.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the accompanying drawings. In adding reference numerals to components of each drawing, it should be noted that the same components have the same reference numerals, although they are indicated on another drawing. In describing the embodiments of the present disclosure, detailed descriptions associated with well-known functions or configurations will be omitted when they may make subject matters of the present disclosure unnecessarily obscure.

In describing components of embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Hereinafter, embodiments of the present disclosure will be described in detail with reference to FIGS. 1 to 4.

Figure 1:
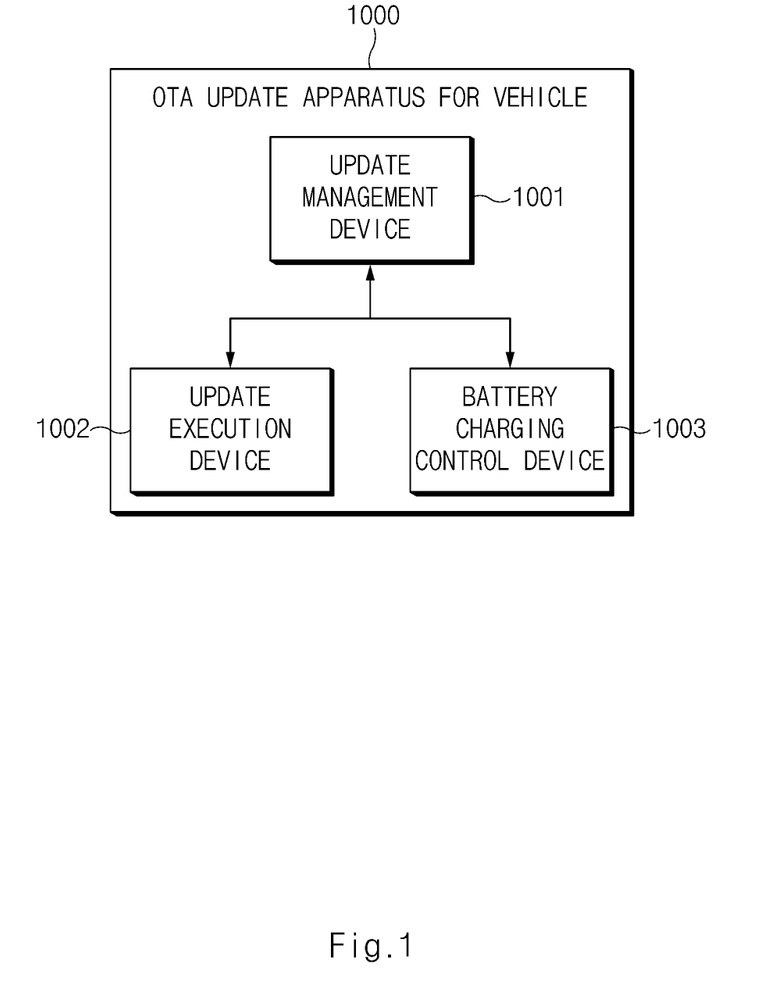
FIG. 1 illustrates an example of an OTA update apparatus for a vehicle, according to embodiments.

FIG. 1 illustrates an example of an OTA update apparatus for a vehicle, according to embodiments of the present disclosure.

FIG. 1 illustrates an example of an OTA update apparatus 1000 (or an apparatus) for a vehicle, according to embodiments.

A vehicle according to embodiments may include at least one of an electric vehicle (EV), a hybrid electric vehicle (HEV), or a plug-in hybrid electric vehicle (PHEV). The type of a vehicle according to embodiments is not limited to the above-described example.

An over-the-air (OTA) update according to embodiments may indicate a method for updating software of a vehicle over a wireless communication network. In general, software of a vehicle is executed by connecting a storage device, in which data for updating the software is stored, to the vehicle by wire. However, thanks to the development of communication technology, the vehicle may directly receive data required to update software over a wireless communication network and then may perform an update.

In general, an OTA update of a vehicle is performed based on a low-voltage battery included in a vehicle battery of the vehicle. However, because a state-of-charge (SOC) value of the vehicle's low-voltage battery has a limit, when the OTA update is performed depending on a low-voltage battery that is not being charged, the OTA update may not be completed and the low-voltage battery may be discharged.

Furthermore, even though the OTA update is performed while the vehicle's low-voltage battery is charged, when the OTA update is not performed after priorities of OTA updates of one or more controllers included in the vehicle are determined, an efficient OTA update may not be performed.

To solve the above-described problems, the apparatus according to embodiments may charge a low-voltage battery of a vehicle while performing an OTA update.

Furthermore, even when charging the low-voltage battery, and at the same time, performing an OTA update, the apparatus according to embodiments may perform an efficient OTA update by determining priorities among OTA updates of vehicle controllers.

The OTA update apparatus for a vehicle according to embodiments may include an update management device 1001, an update execution device 1002, and/or a battery charging control device 1003. The apparatus according to embodiments may further include one or more elements not shown in FIG. 1. The apparatus according to embodiments may be included inside or outside a vehicle.

The update management device 1001 according to embodiments may generate mode information about an OTA update of a vehicle.

An apparatus according to embodiments may perform the OTA update of the vehicle based on the generated mode information. An apparatus according to embodiments may include one or more modes of an OTA update of a vehicle. For example, an apparatus includes a mode in which an OTA update of a vehicle is performed while a low-voltage battery is not charged, a mode in which an OTA update of a vehicle is performed while a low-voltage battery is charged, and a mode in which an OTA update of a vehicle is not performed.

The mode information according to embodiments may be information indicating one of one or more modes of the above-described OTA update of the vehicle. That is, the apparatus performs an OTA update of a vehicle based on a specific mode depending on the generated mode information.

The mode information according to embodiments may be generated based on at least one of an SOC value of a high-voltage battery of the vehicle, an SOC value of a low-voltage battery of the vehicle, or a power state of the vehicle.

The update execution device 1002 according to embodiments may perform OTA updates of one or more controllers included in the vehicle based on the generated mode information.

A vehicle according to embodiments may include one or more controllers. A controller according to embodiments may indicate an electronic control unit (ECU) included in the vehicle.

The OTA update of a vehicle according to embodiments may indicate OTA updates for one or more controllers included in the vehicle. In other words, the OTA update of a vehicle may be performed for each controller included in the vehicle.

The battery charging control device 1003 according to embodiments may control charging of a low-voltage battery of the vehicle based on the generated mode information. That is, the battery charging control device 1003 may or may not charge the low-voltage battery depending on the OTA update mode indicated by the mode information.

Through the method described in FIG. 1, the apparatus according to embodiments may safely complete the OTA update while simultaneously charging the low-voltage battery when performing the OTA update of the vehicle. Moreover, according to various modes of an OTA update of a vehicle, the apparatus may efficiently perform an OTA update of a vehicle by controlling the charging of the low-voltage battery and/or the performing of an OTA update for each controller.

Figure 2:
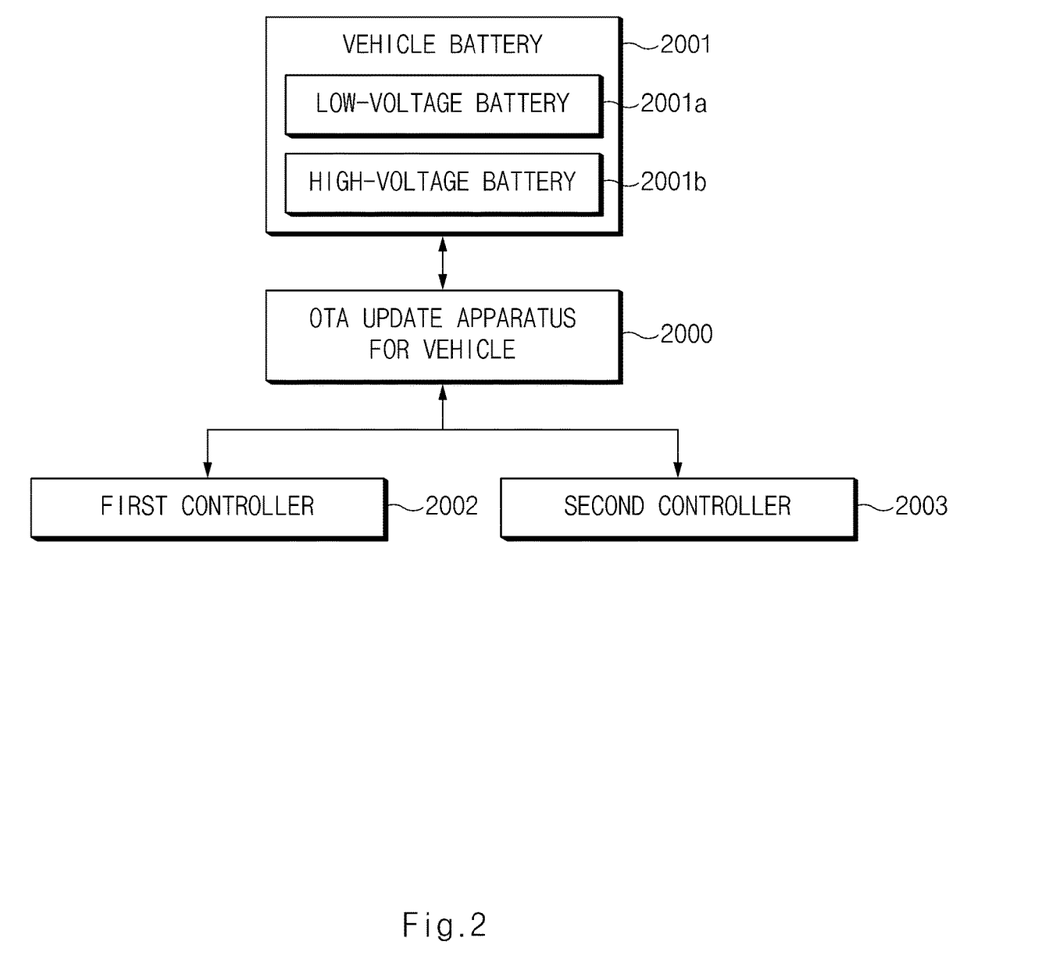
FIG. 2 is a block diagram for describing an operation process of an OTA update apparatus for a vehicle, according to embodiments.

FIG. 2 is a block diagram for describing an operation process of an OTA update apparatus for a vehicle, according to embodiments.

FIG. 2 illustrates a diagram for describing an operation process of an OTA update apparatus 2000 for a vehicle (the apparatus described in FIG. 1) according to embodiments.

As described above with reference to FIG. 1, the apparatus according to embodiments may be included inside or outside a vehicle. The apparatus according to embodiments may exchange information with a vehicle battery, a first controller, and/or a second controller of the vehicle or may control the vehicle battery, the first controller, and/or the second controller of the vehicle.

As described above in FIG. 1, mode information according to embodiments may be generated based on at least one of an SOC value of a high-voltage battery of the vehicle, an SOC value of a low-voltage battery of the vehicle, or a power state of the vehicle. Besides, the mode information may be generated by an update management device (1001 of FIG. 1) included in the apparatus according to embodiments. Accordingly, the apparatus according to embodiments may receive information about an SOC value from each of a low-voltage battery 2001*a* and a high-voltage battery 2001*b* included in a vehicle battery 2001 of the vehicle.

As described above with reference to FIG. 1, a vehicle according to embodiments may include one or more controllers. the one or more controllers included in the vehicle according to embodiments may include a first controller 2002 and/or a second controller 2003.

In addition, as described above in FIG. 1, the OTA update according to embodiments may be performed for each controller. One or more controllers may be classified depending on whether the low-voltage battery is charged during an OTA update process. For example, an OTA update of the first controller 2002 is performed based on a low-voltage battery that is not being charged. Also, for example, an OTA update of the second controller 2003 is performed based on the low-voltage battery 2001*a* being charged.

That is, the apparatus according to embodiments may perform the OTA update of the first controller 2002. In this case, the low-voltage battery 2001*a* may not be charged. The apparatus according to embodiments may perform the OTA update of the second controller 2003. In this case, the low-voltage battery 2001*a* may be charged.

The first controller 2002 according to embodiments may be a controller involved in charging the low-voltage battery 2001*a* of the vehicle. Accordingly, when the OTA update of the first controller 2002 is being performed, the low-voltage battery 2001*a* may not be charged. On the other hand, the second controller 2003 according to embodiments may be a controller that is not involved in charging the low-voltage battery 2001a of the vehicle. Accordingly, even though the OTA update of the second controller 2003 is being performed, the low-voltage battery 2001a may be charged. Both OTA updates of the first controller 2002 and the second controller 2003 may be performed based on the vehicle's low-voltage battery 2001a.

That is, the apparatus according to embodiments may first perform the OTA update of the first controller 2002 involved in charging the low-voltage battery 2001a in a state where the low-voltage battery 2001a is not charged. Afterward, the apparatus may perform the OTA update of the second controller 2003 that is not involved in charging the low-voltage battery 2001a in a state where the low-voltage battery 2001a is charged. That is, during the OTA update process of the second controller 2003, the first controller 2002 may be used to charge the low-voltage battery 2001a.

Through the method described in FIG. 2, the apparatus according to embodiments may safely complete the OTA update while simultaneously charging the low-voltage battery when performing the OTA update of the vehicle. Moreover, an apparatus may efficiently perform an OTA update of a vehicle by changing the charging of the low-voltage battery and/or the performing of an OTA update for each controller depending on various modes of an OTA update of a vehicle.

Figure 3:
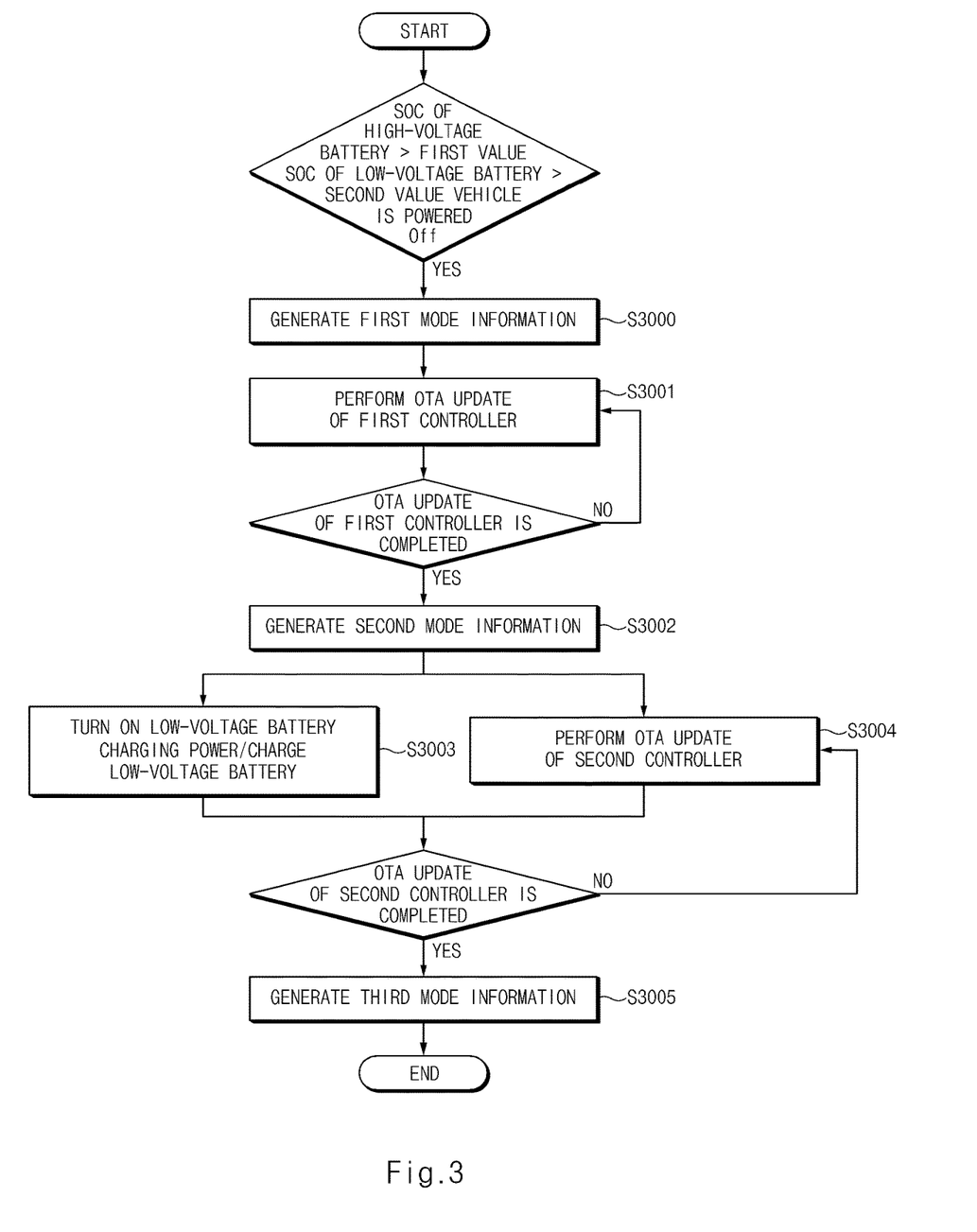
FIG. 3 is a flowchart illustrating an example of an operation process of an OTA update apparatus for a vehicle, according to embodiments.

FIG. 3 is a flowchart illustrating an example of an operation process of an OTA update apparatus for a vehicle, according to embodiments.

FIG. 3 illustrates an example of an operation process (e.g., an OTA update process) of an OTA update apparatus for a vehicle (the apparatus described with reference to FIGS. 1 and 2), according to embodiments.

As described above with reference to FIG. 1, an apparatus according to embodiments may include an update management device, an update execution device, and/or a battery charging control device. One or more steps described in FIG. 1 may be performed by at least one of the update management device, the update execution device, or the battery charging control device included in the apparatus.

The update management device according to embodiments may generate first mode information indicating that an OTA update of a vehicle is performed (S3000), when an SOC value of a high-voltage battery is greater than or equal to a preset first value, an SOC value of a low-voltage battery is greater than or equal to a preset second value, and the vehicle is powered off. The high-voltage battery and the low-voltage battery according to embodiments are the same as or similar to those described above with reference to FIGS. 1 to 2.

The high-voltage battery according to embodiments may charge the low-voltage battery. Accordingly, the SOC value of the high-voltage battery for performing OTA update of the vehicle according to embodiments needs to be greater than or equal to a sum of a management reference lower limit SOC value of the high-voltage battery and a maximum SOC value used to charge the low-voltage battery. A value obtained by adding the management reference lower limit SOC value of the above-described high-voltage battery and the maximum SOC value used to charge the low-voltage battery may indicate the above-described preset first value.

As described above in FIG. 2, an OTA update of the first controller may be performed first without charging the low-voltage battery. In addition, an OTA update of the first controller may be performed based on the low-voltage battery. Accordingly, the SOC value of the low-voltage battery for performing an OTA update of the vehicle according to embodiments may need to be greater than or equal to an SOC value required to complete the OTA update of first controller(s). The SOC value required to complete the OTA update of the first controller(s) may indicate the above-described preset second value.

The OTA update of the vehicle according to embodiments may be performed when the vehicle is powered off.

That is, the update management device may generate first mode information indicating that OTA update of the vehicle is performed, based on the SOC value of the high-voltage battery, the SOC value of the low-voltage battery and the vehicle's power state.

The update execution device according to embodiments may perform an OTA update of the first controller included in one or more controllers when the first mode information is generated (S3001). As described above, the OTA update of the first controller according to embodiments is performed based on the low-voltage battery, but the low-voltage battery may not be charged.

That is, the battery charging control device according to embodiments may not charge the low-voltage battery when the first mode information is generated.

When the OTA update of the first controller according to embodiments is not completed, the above-described step S3001 may be performed again, or an OTA update rollback of the first controller may be performed (not shown in FIG. 3). The OTA update rollback of the first controller according to embodiments may be a process of retuning to a process before an OTA update is performed on the first controller. In other words, through the rollback, the apparatus may delete the performed OTA update and may return to a state before the OTA update has been performed, when an invalid OTA update is performed.

The update management device according to embodiments may generate second mode information indicating that the OTA update of the second controller is performed (S3002), when an OTA update of the first controller is completed.

The update execution device according to embodiments may perform an OTA update of the second controller included in one or more controllers when the second mode information is generated (S3004).

As described above with reference to FIGS. 1 and 2, the OTA update of the second controller may be performed simultaneously with charging the low-voltage battery. The low-voltage battery according to embodiments may be charged by the first controller(s) and/or the high-voltage battery. For example, the first controller charges the low-voltage battery by using a high-voltage battery.

The first controller according to embodiments may be driven by a low-voltage battery charging power corresponding to a part of power of the vehicle. For example, the first controller is driven by ACC power, which is the power of the vehicle, IG power, and IG3 power included in BAT power. That is, to charge the low-voltage battery according to embodiments, the above-described low-voltage battery charging power may need to be turned on.

Accordingly, the battery charging control device according to embodiments may turn on the low-voltage battery charging power used to charge the low-voltage battery and may charge the low-voltage battery (S3003) when the second mode information is generated.

When the OTA update of the second controller according to embodiments is not completed, the above-described step S3004 may be performed again, or an OTA update rollback of the second controller may be performed (not shown in FIG. 3). The description of an OTA update rollback process of the second controller may be the same as or similar to the above-described OTA update rollback process of the first controller.

The update management device according to embodiments may generate third mode information indicating that the charging of the low-voltage battery is interrupted and the low-voltage battery charging power is turned off (S3005), in response to the OTA update of the second controller is completed. The apparatus according to embodiments may interrupt charging of the low-voltage battery and may turn off the low-voltage battery charging power based on the third mode information. That is, the third mode information according to embodiments may be information indicating that the above-described OTA update of the vehicle is completed.

Through the method described in FIG. 3, the apparatus according to embodiments may safely complete the OTA update while simultaneously charging the low-voltage battery when performing the OTA update of the vehicle. Moreover, according to various modes of an OTA update of a vehicle, the apparatus may efficiently perform an OTA update of a vehicle by controlling the charging of the low-voltage battery and/or the performing of an OTA update for each controller.

Figure 4:
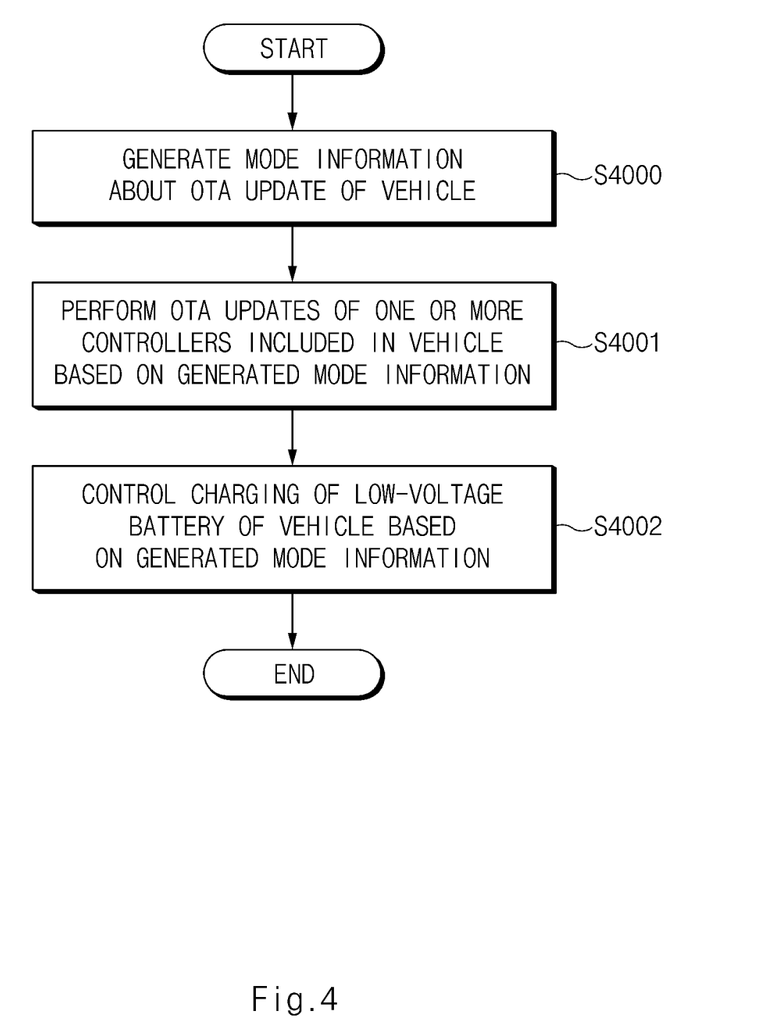
FIG. 4 is a flowchart illustrating an example of an OTA update method for a vehicle, according to embodiments.

FIG. 4 is a flowchart illustrating an example of an OTA update method for a vehicle, according to embodiments.

FIG. 4 illustrates an example of an OTA update method (or a method) for a vehicle, according to embodiments. The OTA update apparatus for a vehicle described above in FIGS. 1 to 4 may perform the method described in FIG. 4.

A method according to embodiments may include step S4000 of generating mode information about an OTA update of the vehicle, step S4001 of performing OTA updates of one or more controllers included in the vehicle based on the generated mode information, and step S4002 of controlling charging of a low-voltage battery of the vehicle based on the generated mode information. The method according to embodiments may further include one or more steps not shown in FIG. 5.

The mode information according to embodiments may be generated based on at least one of an SOC value of a high-voltage battery of the vehicle, an SOC value of a low-voltage battery of the vehicle, or a power state of the vehicle. The detailed description of mode information is the same as or similar to that described above in FIGS. 1 to 3.

Step S4000 according to embodiments may include generating first mode information indicating that the OTA update of the vehicle is performed, when the SOC value of the high-voltage battery is greater than or equal to a preset first value, the SOC value of the low-voltage battery is greater than or equal to a preset second value, and the vehicle is powered off. The detailed description of the above-described step is the same as or similar to that described above with reference to FIG. 3.

According to embodiments, the one or more controllers may include a first controller and a second controller. According to embodiments, an OTA update of the first controller may be performed based on the low-voltage battery not being charged. According to embodiments, an OTA update of the second controller may be performed based on the low-voltage battery being charged. According to embodiments, descriptions of the first controller and the second controller are the same as or similar to those described above with reference to FIG. 2.

Step S4001 according to embodiments may include performing an OTA update of the first controller included in one or more controllers when the first mode information is generated. The detailed description of the above-described step is the same as or similar to that described above with reference to FIG. 3.

Step S4002 according to embodiments may include not charging the low-voltage battery when the first mode information is generated. The detailed description of the above-described step is the same as or similar to that described above with reference to FIG. 3.

Step S4000 according to embodiments may further include generating second mode information indicating that the OTA update of the second controller is performed, when the OTA update of the first controller is completed. The detailed description of the above-described step is the same as or similar to that described above with reference to FIG. 3.

Step S4001 according to embodiments may further include performing an OTA update of the second controller included in one or more controllers when the second mode information is generated. The detailed description of the above-described step is the same as or similar to that described above with reference to FIG. 3.

Step S4002 according to embodiments may include turning on the low-voltage battery charging power used to charge the low-voltage battery and charging the low-voltage battery when the second mode information is generated. The detailed description of the above-described step is the same as or similar to that described above with reference to FIG. 3.

The low-voltage battery charging power according to embodiments may correspond to a part of power of the vehicle. A description of the low-voltage battery charging power according to embodiments is the same as or similar to that described above in FIG. 3.

Step S4000 according to embodiments may further include generating third mode information indicating that charging of the low-voltage battery is interrupted and the low-voltage battery charging power is turned off, in response to the OTA update of the second controller is completed. The detailed description of the above-described step is the same as or similar to that described above with reference to FIG. 3.

Through the method described in FIGS. 1-4, the apparatus according to embodiments may safely complete the OTA update while simultaneously charging the low-voltage battery when performing the OTA update of the vehicle. Moreover, according to various modes of an OTA update of a vehicle, the apparatus may efficiently perform an OTA update of a vehicle by controlling the charging of the low-voltage battery and/or the performing of an OTA update for each controller.

The above description is merely an example of the technical idea of the present disclosure, and various modifications and modifications may be made by one skilled in the art without departing from the essential characteristic of the present disclosure.

Accordingly, embodiments of the present disclosure are intended not to limit but to explain the technical idea of the present disclosure, and the scope and spirit of the present disclosure is not limited by the above embodiments. The scope of protection of the present disclosure should be construed by the attached claims, and all equivalents thereof should be construed as being included within the scope of the present disclosure.

According to embodiments, it is possible to charge a low-voltage battery while an OTA update is performed.

Furthermore, according to embodiments, it is possible to determine priorities among OTA updates of vehicle controllers even though the low-voltage battery is charged and, at the same time, an OTA update is performed.

Besides, a variety of effects directly or indirectly understood through the specification may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An over-the-air (OTA) update apparatus for a vehicle, the OTA update apparatus comprising:
at least one processor operably connected to a wireless communication network for receiving an OTA update, and operably connected to a battery including a low-voltage battery of the vehicle, the at least one processor operable to:
generate mode information, by an update management device, about the OTA update of the vehicle;
perform OTA updates, by an update execution device, of one or more controllers included in the vehicle based on the generated mode information; and
control charging, by a battery charging control device, of the low-voltage battery of the vehicle based on the generated mode information,
wherein the one or more controllers include a first controller and a second controller,
wherein an OTA update of the first controller is performed based on the low-voltage battery that is not being charged, and
wherein an OTA update of the second controller is performed based on the low-voltage battery that is being charged.

2. The apparatus of claim 1, wherein the mode information is generated based on at least one of a state of charge (SOC) value of a high-voltage battery of the vehicle, an SOC value of the low-voltage battery of the vehicle, or a power state of the vehicle.

3. The apparatus of claim 2, wherein the update management device generates first mode information indicating that the OTA update of the vehicle is performed, when the SOC value of the high-voltage battery is greater than or equal to a preset first value, the SOC value of the low-voltage battery is greater than or equal to a preset second value, and the vehicle is powered off.

4. The apparatus of claim 1, wherein the update execution device performs the OTA update of the first controller included in the one or more controllers when the first mode information is generated.

5. The apparatus of claim 3, wherein the battery charging control device does not charge the low-voltage battery when the first mode information is generated.

6. The apparatus of claim 4, wherein the update management device generates second mode information indicating that the OTA update of the second controller is performed, when the OTA update of the first controller is completed.

7. The apparatus of claim 6, wherein the update execution device performs the OTA update of the second controller included in the one or more controllers when the second mode information is generated.

8. The apparatus of claim 6, wherein the battery charging control device turns on low-voltage battery charging power used to charge the low-voltage battery and charges the low-voltage battery when the second mode information is generated, and
wherein the low-voltage battery charging power corresponds to a part of power of the vehicle.

9. The apparatus of claim 8, wherein the update management device generates third mode information indicating that charging of the low-voltage battery is interrupted and the low-voltage battery charging power is turned off, when the OTA update of the second controller is completed.

10. An over-the-air (OTA) update method for a vehicle, the method comprising:
generating, by an update management device, mode information about an OTA update of the vehicle;
performing, by an update execution device, OTA updates of one or more controllers included in the vehicle based on the generated mode information; and
controlling, by a battery charging control device, charging of a low-voltage battery of the vehicle based on the generated mode information,
wherein the one or more controllers include a first controller and a second controller,
wherein an OTA update of the first controller is performed based on the low-voltage battery that is not being charged, and
wherein an OTA update of the second controller is performed based on the low-voltage battery that is being charged.

11. The method of claim 10, wherein the mode information is generated based on at least one of an SOC value of a high-voltage battery of the vehicle, an SOC value of the low-voltage battery of the vehicle, or a power state of the vehicle.

12. The method of claim 11, wherein generating the mode information includes:
generating first mode information indicating that the OTA update of the vehicle is performed, when the SOC value of the high-voltage battery is greater than or equal to a preset first value, the SOC value of the low-voltage battery is greater than or equal to a preset second value, and the vehicle is powered off.

13. The method of claim 10, wherein performing the OTA updates includes:
performing the OTA update of the first controller included in the one or more controllers when the first mode information is generated.

14. The method of claim 12, wherein controlling the charging of the low-voltage battery includes:
not charging the low-voltage battery when the first mode information is generated.

15. The method of claim 13, wherein generating the mode information further includes:
generating second mode information indicating that the OTA update of the second controller is performed, when the OTA update of the first controller is completed.

16. The method of claim 15, wherein performing the OTA updates further includes:
performing the OTA update of the second controller included in the one or more controllers when the second mode information is generated.

17. The method of claim 15, wherein controlling the charging of the low-voltage battery includes:
turning on low-voltage battery charging power used to charge the low-voltage battery and charging the low-voltage battery when the second mode information is generated, and wherein the low-voltage battery charging power corresponds to a part of power of the vehicle.

18. The method of claim 17, wherein generating the mode information further includes:
generating third mode information indicating that charging of the low-voltage battery is interrupted and the low-voltage battery charging power is turned off, when the OTA update of the second controller is completed.

\* \* \* \* \*